United States Patent [19]

Rabinow

[11] 3,734,511

[45] May 22, 1973

[54] STRING-SUPPORTED PHONOGRAPH CARTRIDGE

[76] Inventor: Jacob Rabinow, 6920 Selkirk Drive, Bethesda, Md. 20034

[22] Filed: June 14, 1971

[21] Appl. No.: 152,730

[52] U.S. Cl. ....................274/1 R, 274/25, 274/23 R

[51] Int. Cl. ................................................G11b 3/02

[58] Field of Search.......................267/160; 308/2 A; 274/23, 34, 37, 25

[56] References Cited

UNITED STATES PATENTS

| | | | |
|---|---|---|---|
| 3,572,724 | 3/1971 | Rabinow | 274/23 A |
| 3,550,437 | 12/1970 | Skinner | 347/7 |
| 646,014 | 3/1900 | Wouwermans | 274/34 |

*Primary Examiner*—Harry N. Haroian
*Attorney*—Max L. Libman

[57] ABSTRACT

To reduce the mass of the cartridge-tonearm system of a phonograph pickup to a minimum, the arm is completely eliminated and the cartridge is supported on two pairs of thin strings attached at their upper ends to a servo-driven carriage and at the other ends to four spaced points on the cartridge at such an angle that the projection of the strings of each pair meets at the surface of the record to provide a virtual axis of rotation at the surface of the record at a point below the cartridge, so that the stylus will move substantially in a perfect straight vertical line when playing a warped record and will follow the record with an extremely small effective mass as seen by the stylus.

6 Claims, 5 Drawing Figures

PATENTED MAY 22 1973 3,734,511

INVENTOR

Jacob Rabinow

BY Max L. Libman

ATTORNEY

STRING-SUPPORTED PHONOGRAPH CARTRIDGE

As the stylus pressures required by modern cartridges get lower and lower and approach one-tenth of a gram, the effective mass of the cartridge and of the supporting system becomes more and more important. In order to make the cartridge shock-proof, that is, safe against vibration of the phonograph system as a whole, and to enable it to follow warped records, it is important to reduce the mass of the cartridge-arm system as seen by the stylus to as low a value as possible.

In order to accomplish this, I have devised a phonograph stylus support which uses no conventional arm at all. In previous U.S. Pat. Nos. 3,356,372 and 3,390,886, I showed two mountings which are the equivalent of very short arms pivoted near or at the surface of the record. In U.S. Pat. No. 3,390,886, the pivot point could be located at the surface of the record. Both of these patents show rather complicated designs and in both additional masses have been added to the cartridge to provide counter-balancing forces.

In the present embodiment I suspend the cartridge on four strings and the plane in which the projection of the strings meet is at the surface of the record. This produces an instantaneous axis of rotation for the cartridge at the surface of the record at a point below the cartridge itself. By suitably proportioning this construction, the cartridge can be made to act as its own counterbalance and the vertical force on the stylus can be made as low as desired. By having the pivot point at the surface of the record, the stylus will move automatically in a straight line up and down when playing a warped record and the effective mass as seen by the stylus is thus made to be extremely small.

The specific nature of my invention, as well as other objects and advantages thereof, will clearly appear from a description of a preferred embodiment as shown in the accompanying drawings, in which.

Figure 1:
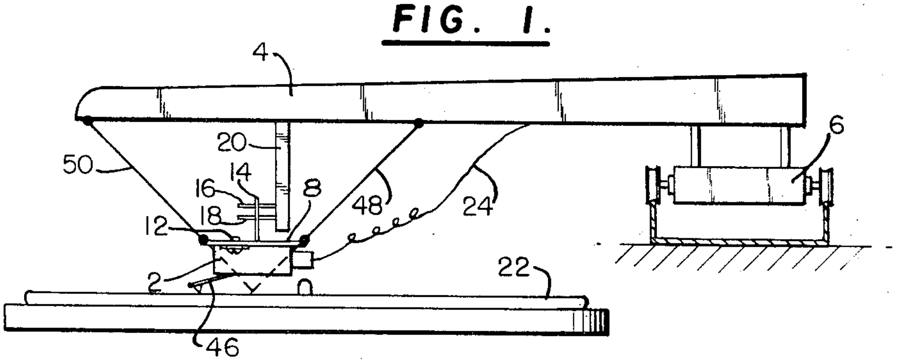
FIG. 1 is a schematic side view of a cartridge and tone arm showing the principle of the invention.

FIG. 1 shows the general construction. The cartridge 2 is suspended from an arm 4 mounted on a servo carriage 6 such as shown in U.S. Pat. Nos. 2,915,315 and 3,572,724. For convenience I show a small mounting plate 8 to which the cartridge 2 is fastened by two screws 10 and 12. A contact wire 14 is mounted on plate 8 and periodically contacts two servo wires 16 and 18 mounted on the support arm 4. The servo contact wires 16 and 18 act in the manner fully described in the U.S. Pat. Nos. 2,915,315 and 3,572,724 referred to above. The contact 14 is mounted on the plate 8 and moves laterally with the cartridge 2. The two contact wires 16 and 18 are mounted on a post 20 mounted on the rigid arm 4.

Figure 2:
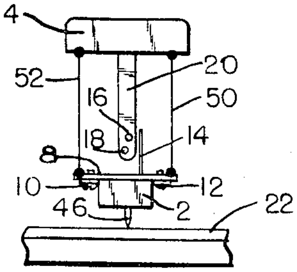
FIG. 2 is an end view of the device shown in FIG. 1.

Contact 16 is closer to the contact 14 and is the servo control contact. It is arranged so that it contacts just as the cartridge 2 is moved from the central position shown in FIG. 2. Thus, as the cartridge 2 plays the record 22, the cartridge moves to the left as seen in FIG. 2. When the wires 14 and 16 touch, the servo moves the support 4 and the contacts open. When the end of the record is reached, the servo cannot follow the fast "run-off" groove and the contacts 14 and 18 touch.

This operates the "arm lift" mechanism. The arm is lifted as explained in U.S. Pat. Nos. 2,915,215 and 3,572,724 and the whole assembly of the arm 4 and cartridge 2 is lifted from the record. A thin, flexible cable 24 connects the cartridge 2 and the movable servo contact 14 to the rest of the system.

Figure 3:
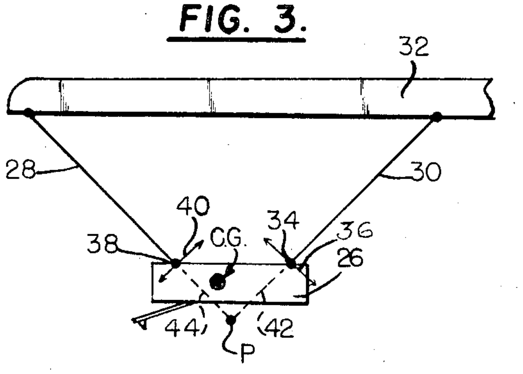
FIGS. 3 and 4 are explanatory schematic side views showing the principle of the invention.

FIG. 2 shows the end view of the arrangement of FIG. 1 and FIG. 3 illustrates the basic geometry of the system.

In the two-dimensional schematic FIG. 3, which considers only motion in the plane of the drawing, a body 26 is connected by two flexible members (such as cotton threads 28 and 30) to a fixed member 32. The point 34 on the body 26 can only move along the line 36, while the point 38 can move along the line 40. These lines are the instantaneous velocity vectors. It should be understood that these lines can be considered as straight lines for short distances only. The instantaneous center around which the body 26 revolves is where the two perpendiculars drawn to the velocity vectors 36 and 40 meet. This is at point P. It will be seen that the two perpendicular lines 42 and 44 are really the continuations of the strings 30 and 28.

We can so position the body 26 that its center of gravity C.G. can be located slightly to the left of point P so that in a practical case of a phono cartridge 2 we can produce the desired vertical force on the stylus. For practical reasons I prefer to connect the four strings that support the cartridge 2 in FIGS. 1 and 2 not directly to the cartridge 2, although this can be done, but to the small light metal or plastic plate 8 to which the cartridge 2 is attached by screws 10 and 12. This enables me to slide the cartridge 2 along the plate 8 so as to place its center of gravity at the desired location.

The result of this construction is that the conventional arm is eliminated and the phono cartridge can follow warped records with great ease. It can also withstand vibration of the entire mechanism without being thrown off the record, as happens with conventional arms that must reflect a considerable amount of mass to the cartridge. This can be seen in FIG. 4, which shows the effect of a warped record in an exaggerated way so that the action can be clearly seen. Assuming the record 22′ is warped as shown at 23, then the cartridge tilts up at the front as though it were rotating about point P initially. Of course, as it tilts, the strings 28 and 30 move from their original position shown in dotted line to a new position such that point P shifts slightly to the rear, but only by a negligible amount, and the practical effect is still that of rotation of the cartridge about a center or axis of rotation which is substantially at the plane of the record, since it must be kept in mind that the maximum amount of warping we are considering is in practice only a small fraction of an inch.

Figures 4, 5:
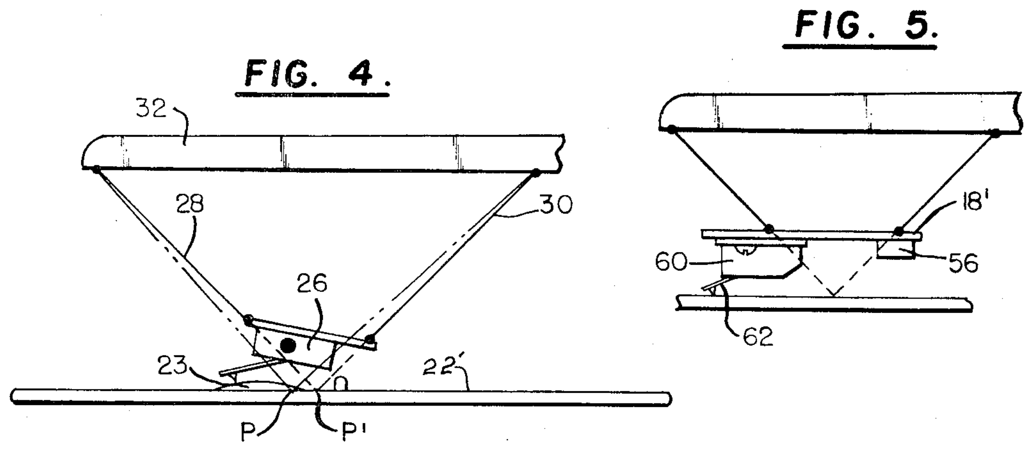
FIG. 5 shows a modified form of the invention.

If the effective pivot point P is too close to the stylus because of the distribution of the mass to the cartridge, I can add some small amount of mass 56 as a counterweight as can be seen in FIG. 5. Here the plate 18 carries an additional weight 56. This enables me to move the cartridge 60 forward and increase the distance from the effective pivot P to the stylus 62.

In place of the flexible strings 48, 50, 52 and the fourth not visible in FIGS. 1 and 2 that support the cartridge 2, flexible wires can be used both for the support of the cartridge and to connect the cartridge to the electrical circuit of an amplifier. The wires must be very flexible and such wires may be of a type called "Litz" wires or "Tinsel" wires. If wires are used to support and also to connect the cartridge, the terminations of the wires must, of course, be fastened to insulated terminals.

Instead of flexible strings or wires, these could be rigid, but provided at the end with very free bearing members such as loose interlinked loop members permitting the same degree of freedom as the flexible support members.

I claim:

1. a. For use with a disc phonograph record, a playback cartridge support comprising a plurality of linear members supporting said cartridge from a tone arm at its normal playing distance above the record being played, said linear members being longitudinally unstretchable and laterally flexible, b. said linear members being arranged to permit the cartridge to move freely laterally in a plane parallel to the disc record being played, and to pivot vertically about an instantaneous axis which lies in the plane of the record and is perpendicular to the record groove being played.

2. a. A phonograph cartridge supporting system comprising b. a servo-driven pickup arm having supporting means for a phonograph cartridge, said arm providing for radial motion of a cartridge across a record disc being played, c. said supporting means comprising a plurality of linear members which are longitudinally unstretchable but laterally flexible, d. the top ends of said members being fastened to said pickup arm at points a fixed distance apart, e. the bottom ends of at least some of said members being fastened to the cartridge a lesser distance apart than the respective top ends so that at least some of the linear members form an angle such that the imaginary projections of said members intersect the record surface below said cartridge and rearwardly of its center of gravity from the playing end of the cartridge, f. said linear members being of such a length as to support the cartridge, in its normal playing position, above the upper surface of the record plane.

3. a. A cartridge supporting arrangement for playing a phonograph record consisting of four strings in two pairs suspended from a tone arm b. each pair of said strings being located in a vertical plane, c. the strings of each pair being at an angle to each other, with the top ends of each string fastened to a rigid support, and the bottom ends fastened to the cartridge, d. the imaginary projections of each pair of strings meeting at the surface of the record.

4. a. A phonograph cartridge supporting system comprising b. a servo-driven pickup arm having supporting means for a phonograph cartridge, said arm providing for radial motion of a cartridge across a record disc being played, c. said supporting means comprising two pairs of flexible string members, each pair being located in a substantially vertical plane perpendicular to the radial motion of the cartridge, d. the top ends of the strings of each pair being fastened to said pickup arm a fixed distance apart, e. the bottom ends of each pair being fastened to the cartridge a lesser distance apart so that the two strings form an angle such that the imaginary projections of the two strings meet at a point on the surface of a record being played, f. each pair of strings supporting one side of the cartridge so that the cartridge is normally held in level playing position above the record plane.

5. The invention according to claim 4 g. and servomechanism for driving said pickup arm to maintain said cartridge directly above the record groove as the record is being played.

6. The invention according to claim 5 h. said servomechanism including contact means movable laterally with said cartridge during the playing of a record, and cooperating contact means on said pickup arm to control the motion of said arm.

* * * * *